United States Patent [19]

Recht

[11] 3,970,531
[45] July 20, 1976

[54] DECREASING THE CYANIDE AND HEAVY METAL CONTENT OF AN AQUEOUS SOLUTION

[75] Inventor: Howard L. Recht, Northridge, Calif.

[73] Assignee: Rockwell International Corporation, El Segundo, Calif.

[22] Filed: Nov. 28, 1975

[21] Appl. No.: 635,813

Related U.S. Application Data

[62] Division of Ser. No. 503,198, Sept. 4, 1974.

[52] U.S. Cl. ............................. 204/149; 204/72; 204/110; 204/130; 204/131; 204/151; 204/152

[51] Int. Cl.² ................... C02B 1/82; C25F 7/00; C25F 7/02

[58] Field of Search ............ 204/72, 110, 130, 131, 204/149, 151, 152

[56] References Cited
UNITED STATES PATENTS

| | | | |
|---|---|---|---|
| 3,457,152 | 7/1969 | Maloney, Jr. et al. | 204/131 |
| 3,616,356 | 10/1971 | Roy | 204/152 |
| 3,645,867 | 2/1972 | Ericson et al. | 204/130 |
| 3,756,932 | 9/1973 | Zievers et al. | 204/149 |
| 3,764,499 | 10/1973 | Okubo et al. | 204/151 |

Primary Examiner—John H. Mack
Assistant Examiner—A. C. Prescott
Attorney, Agent, or Firm—L. Lee Humphries; Henry Kolin; Clark E. DeLarvin

[57] ABSTRACT

Apparatus and method are provided for concurrently decreasing the cyanide and heavy metal content of an aqueous solution, such as a waste water.

The apparatus comprises an electrochemical cell provided with separate cathode and anode compartments. Each of the compartments contains a bed of electrically conductive particles. The compartments are separated by an electronically nonconductive foraminous member.

In accordance with the method, an aqueous solution containing cyanide ion and at least one heavy metal in soluble form is passed sequentially through the beds of electrically conductive particles contained in each of two compartments of an electrochemical cell. A direct electric current is passed between the two compartments making one compartment cathodic and the other anodic. The heavy metal is deposited upon the particles in the cathodic compartment and the cyanide is oxidized in the anodic compartment. The aqueous solution having a substantially reduced cyanide and heavy metal content then is discharged from the electrochemical cell.

4 Claims, 1 Drawing Figure

U.S. Patent  July 20, 1976  3,970,531
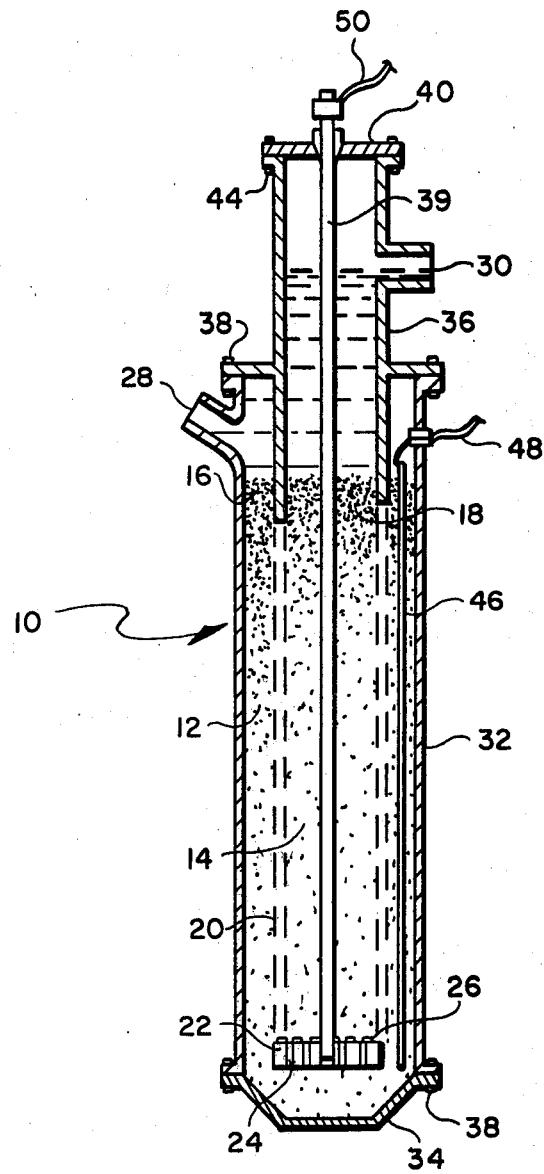

DECREASING THE CYANIDE AND HEAVY METAL CONTENT OF AN AQUEOUS SOLUTION

CROSS REFERENCE TO RELATED APPLICATION

This application is a division of application Ser. No. 503,198, filed Sept. 4, 1974.

BACKGROUND OF THE INVENTION

1. Field of the Invention.

The present invention relates to an apparatus and method for concurrently reducing the cyanide and heavy metal content of aqueous solutions. Broadly, the apparatus and method are based on electrolytic techniques and include an electrochemical cell having separate anode and cathode compartments.

There is considerable and growing concern over pollution of the nation's waterways with various contaminants such as cyanide, mercury and various heavy metals. Mercury is known to be a neuro-poison and is especially dangerous in the alkyl mercury form in which it is often found in water and aquatic life. Cadmium in river water has been identified as the cause of a painful disease (itai itai). Lead and other heavy metals are suspected of being dangerous pollutants in our waters. Cyanide is toxic to many forms of life and, obviously, is an undesirable pollutant.

Many of these pollutants enter our waters from industrial sources, such as metal finishing plants and from mining sources. Recent steps to limit the pollution from these sources have been relatively effective. However, some reduced but significant quantities of these pollutants will continue to come from industries and mines unless treatment specifically directed toward their removal is given.

Contamination also may arise from "natural" sources, e.g., mercury at levels to cause concern has been found in lakes where little, if any, human activity has occurred. To clean up these waters, the only course open is to treat them to remove the specific contaminants.

2. Prior Art

Various methods have been proposed or are reported to be available and in use for removal of cyanide and various heavy metals from water.

A method of decreasing the amount of cyanide ions in a solution is described in U.S. Pat. No. 3,764,497. The method comprises passing a current through an electrolytic cell containing (a) at least one positive and one negative electrode, (b) an electrolyte containing cyanide ions, and (c) a bed of nonconductive particles. The particles are distributed by the flow of the electrolyte through the bed of particles. The patent also discloses that the copper content of the electrolyte is decreased.

Another method of decreasing the cyanide content of a solution is described in U.S. Pat. No. 3,764,498. The method comprises passing the solution through an electrolytic cell containing at least one positive and one negative electrode and a bed of particles having a certain specified bed porosity. The patent discloses that the particles may be either conductive, nonconductive or semiconductive. Suitable conductive materials disclosed include copper, silver, zinc, graphite and the like. The patent also discloses that some of the copper in the solution was plated on the cathode due to the electrochemical reduction of copper to the metal.

In U.S. Pat. No. 3,457,152 there is disclosed an electrolytic apparatus and process for removing trace metals from an aqueous solution. Broadly, the process comprises subjecting the solution to a direct electric current in the presence of at least one anode and a lead shot cathode.

A method of decreasing the metallic content of liquids also is found in U.S. Pat. No. 3,755,114. The method described therein comprises passing an electric current through a solution containing metallic materials, which solution is contained as the electrolyte in a cell. The cell has at least one positive and one negative electrode between which the current is passed. The electrolyte also contains a bed of particles distributed therein, such that the porosity of the bed is within certain defined limits.

More recently, in U.S. Pat. No. 3,764,499 there is disclosed a process for the removal of both cyanide and metals from a waste water. The method comprises introducing the waste water into a cell having a first major electrode chamber which is filled by granular or fibrous electric conductors and a major electrode. The first major electrode chamber is separated from a second electrode chamber of opposite polarity by an ion exchange membrane. A potential is applied across the cell to effect electrolytic reaction with decomposition of the contaminants in the first major electrode chamber and with migration of the residual contaminants through the membrane into the second electrode chamber for further electrolytic reaction with decomposition of the residual contaminants. The Patentee suggests the use of various materials for the granular or fibrous electric conductors including graphite, metal particles, platinum particles and titanium particles.

The foregoing proposed and currently commercially available methods for metal removal, e.g., chemical precipitation, reverse osmosis, ion exchange, and absorption, are generally costly, require elaborate equipment, are specific for only a few metals, or present serious waste disposal problems. In addition, they are, in general, not able to attain the very low effluent metal levels contemplated in prospective future governmental regulations dealing with water contamination. Certain of these methods merely substitute one undesirable metal ion in place of the metal ion being removed. Clearly, therefore, there is need for an effective economical method of removing cyanide and metal ions from an aqueous solution such as an industrial waste water.

Other patents considered in the preparation of this application are U.S. Pat. Nos. 2,520,703; 3,730,864; 3,728,238; 2,773,025; 3,515,664; 3,616,356; 3,679,557; and 3,766,034.

SUMMARY OF THE INVENTION

In accordance with the present invention, it has been found that both the cyanide and heavy metal content of an aqueous solution may be concurrently reduced utilizing a certain electrochemical cell having separate anode and cathode compartments.

In one embodiment of the present invention there is provided an electrochemical cell usable for the concurrent removal of cyanide and heavy metals from aqueous solutions containing the same. Broadly, the cell includes a cathode compartment which contains a bed of electrically conductive particles. The cathode compartment also has a conduit means located adjacent to the bed of particles to provide liquid communication between the cathode compartment and the exterior of the cell. Separate from the cathode compartment is an anode compartment which also contains a bed of electrically conductive particles and has a conduit means located adjacent to the bed of particles to provide liquid communication between the anode compartment and the exterior of the cell. Intermediate the cathode and anode compartments is an electronically nonconductive foraminous member separating the two compartments. It is an essential feature of the invention that the foraminous member be substantially water impermeable. The foraminous member is provided with a plurality of openings having a median size within the range from about $10^{-6}$ to $10^{-14}$ square centimeters, to permit the free passage of electrically charged ions between the cathode and anode compartments, and substantially minimize any passage of liquid therebetween. The electrochemical cell also includes a liquid passageway which is located in a spaced relation from the conduit means to provide liquid communication between the cathode compartment and anode compartment, whereby a liquid flowing through the electrochemical cell must flow through a substantial portion of each of the beds of electrically conductive particles. The cell further includes electrical means connected to the cathode and anode compartments for passage of a direct electric current therebetween.

In accordance with another embodiment of the invention, there is provided a method of concurrently removing cyanide and heavy metals from an aqueous solution containing the same. The method comprises passing the aqueous solution sequentially through a bed of electrically conductive particles contained in a first compartment and a bed of electrically conductive particles contained in a second compartment of an electrochemical cell. The first compartment is separated from the second compartment by an electronically nonconductive foraminous member. The foraminous member has a plurality of openings having a median size within the range of from about $10^{-6}$ to $10^{-14}$ square centimeters. An applied potential of from about 1.0 to 10 volts is maintained between the first and second compartments whereby a direct electric current flows between the compartments through the solution and the foraminous member. The heavy metal is deposited upon the electrically conductive particles in the cathodically polarized compartment and the cyanide is oxidized in the anodically polarized compartment. The aqueous solution discharged from the cell is substantially free of heavy metal and cyanide. In accordance with a preferred embodiment, the aqueous solution containing cyanide and heavy metal first is introduced into a cathodically polarized compartment and then into an anodically polarized compartment.

The present invention is an improvement over that shown in co-pending application Ser. No. 477,531, filed June 7, 1974 and assigned to the Assignee of the present invention which discloses a method of removing various heavy metals from an aqueous solution. The method comprises passing the solution through an electrochemical cell containing an anode and a bed of cathodically polarized particles having tin surfaces. A direct current is passed from the anode through the solution to the particles, whereby the heavy metal is removed from the solution and deposited on the tin surfaces of the particles.

In accordance with the present invention both cyanide and heavy metals are concurrently removed in a single cell. The advantages obtained thereby are apparent and include, among others, fewer components (only one cathode and anode are required), thus, providing a more compact design. Further, since the cell is more compact and concurrent removal takes place in a single cell, the electrical power consumption is substantially lower.

BRIEF DESCRIPTION OF THE DRAWING

The sole FIGURE is a cross-sectional view of an electrochemical cell constructed in accordance with the present invention.

DETAILED DESCRIPTION

Referring to the drawing, there is shown an electrochemical cell 10 for the concurrent removal of cyanide and at least one heavy metal from an aqueous solution containing the same, and which is constructed in accordance with the present invention. Electrochemical cell 10 contains a cathode compartment 12 and an anode compartment 14. Each of compartments 12 and 14 contains a bed of electrically conductive particles 16 and 18, respectively.

The particles employed in the present method and apparatus are particulate materials that are electrically conductive. By electrically conductive it is meant that the material will have a resistivity of less than about $1.5 \times 10^{-3}$ ohm-cm, and preferably less than $10^{-4}$ ohm-cm.

The electrically conductive particles may be of any of various metals or alloys, the selection of which is well within the skill of those versed in the art. Examples of suitable materials for the particles for use in the anode compartment include graphite, tantalum, titanium, stainless steels and the metals of Group VIII of the Periodic Table of the Elements. Examples of suitable materials for the particles for use in the cathode compartment include copper, nickel, tin, zinc, silver and gold. For reasons that will be discussed more fully later, the preferred materials for use in the cathode and anode compartments are tin and graphite, respectively.

The particles may range in size from about 100 mesh (U.S. sieve size) up to about 10 mesh. A preferred size is within the range of from about 60 mesh up to about 12 mesh. It has been found that particles substantially smaller than the sizes set forth are more difficult to contain in their respective compartments. Further, they tend to pack down restricting the flow of liquids therethrough. Substantially larger particles, on the other hand, do not provide sufficient surface area for optimum results, thus necessitating an increase in the compartment size to provide room for additional particles or a decreased flow rate to provide an increase in the residence time of the liquid in the compartment or both.

The particles may be of uniform composition or may comprise an electrically conductive material coated on a nonmetallic or nonconductive substrate such as solid or hollow glass or plastic beads. A conductive metal layer, such as silver, nickel or copper, may be deposited by electroless plating or other means to impart electrical conductivity to the nonmetallic substrate. If desired, a different metal coating then is applied by conventional electroplating.

Located intermediate the two beds of particles is an electronically nonconductive foraminous member 20. It is an essential feature of the present invention that the foraminous member also be substantially water impermeable and still permit substantially free movement of electrically charged ions between the two compartments. More particularly, less than about 1% by volume of the aqueous solution should permeate the foraminous member and preferably less than about 0.1%. This feature is obtained by providing in the foraminous member a plurality of holes, the median hole size being within the range of from about $10^{-6}$ to $10^{-14}$ square centimeters, and preferably a median hole size within the range of $10^{-10}$ to $10^{-12}$ square centimeters.

The foraminous member should have a porosity of at least about 25%. That is to say, the foraminous member should have an apparent density of less than about 75% of the density of the base material from which it is formed. Preferably, it will have an apparent density as low as possible such as, for example, an apparent density of about 10% to 20% of that of the base material.

The foraminous member also must be electronically non-conductive. As used herein, the term "electronically non-conductive" means a material having a resistivity of at least about $10^7$ ohm-cm and preferably at least about $10^{10}$ ohm-cm. Examples of suitable materials include woven and nonwoven nylon, cellophane or ceramics such as oxides of silicon, zirconium, tantalum, beryllium and mixtures thereof.

Attached to the lower end of foraminous member 20 is a bed support plate 22 which is provided with a plurality of apertures 24 therethrough to permit liquid flow from one compartment to the other.

It is essential that there be provided some means to prevent the particles from one bed from moving and making electrical contact with particles in the other bed. This may be accomplished by making bed support 22 electronically nonconductive and providing apertures 24 smaller than the particles. Alternatively, bed support 22 may be provided with an electronically nonconductive screen 26 having a mesh size smaller than that of the particles in either bed. Cell 10 also is provided with openings 28 and 30 to provide a liquid passageway for compartments 12 and 14, respectively.

Advantageously, the apparatus comprises a plurality of discrete parts to facilitate manufacture, disassembly, cleaning, inspection and the like. Therefore, as depicted in the drawing, electrochemical cell 10 comprises a body member 32, a bottom member 34, and a cop member 36. The bottom member 34 and top member 36 are secured to body member 32, preferably by a plurality of threaded fasteners 38. The aforementioned members preferably are attached in such a manner as to form a liquid seal. The manner in which such seal is accomplished is not critical and many ways are known to those versed in the art such as, for example, by the use of adhesives, sealants, gaskets, O rings, polished mating surfaces and the like.

The various cell members such as 32, 34, and 36 may be made of any material, the selection not being critical. Advantageously, however, the material selected is one that is substantially inert with respect to the solutions being processed. The selected material may be either electrically conductive or electrically nonconductive. A preferred material is one which is nonconductive. Most plastic materials, for example, are particularly suited for use as they are inert with respect to most aqueous solutions, relatively inexpensive, easy to fabricate, and electrically nonconductive.

The cell is provided with at least one anode collector 39 located substantially in the center of anode compartment 14 and extending longitudinally a substantial depth into the bed of particles 18. Anode collector 39 extends through and is held by support plate 40, which in turn is secured to upper member 36 by fastening means 44, which may be a plurality of threaded fasteners.

Also provided in the cell is at least one, and preferably a plurality of cathode collectors 46, extending a substantial depth into the bed of particles 16. The cathode and anode collectors are connected to a source of direct electrical current (not shown) by wires 48 and 50, respectively. The anode and cathode collectors preferably are constructed of or plated with the same material selected for the particles contained in their respective compartments.

It will be apparent to those versed in the art that the polarity of the compartments depicted in the drawing could be reversed without departing from the scope of the present invention. Further, the volume of the various compartments and overall shape of the apparatus may be varied. The relative volumes of the two compartments will of course depend upon the composition of the aqueous solutions to be treated and the degree of decrease in cyanide and heavy metal content desired. The overall volume of the cell will depend upon the volume of the solution to be processed in a given time as well as the concentration of cyanide and heavy metal contained in the solution. The shape of the unit also is not particularly critical. Thus, as depicted in its preferred form, it is substantially cylindrical. It could be made, however, rectangular, hexagonal or any other desired shape. It also will be apparent that a plurality of cells may be connected in parallel or series to provide an increased volumetric capacity while providing a desired residence time of the solution being treated in each cell. Obviously, a combination of the foregoing also can be utilized viz., a series-parallel arrangement of cells.

In accordance with the present invention, cyanide and one or more heavy metals are concurrently removed from an aqueous solution of the same. It will be appreciated that in any unit volume of solution being treated that only the heavy metal or cyanide content is being reduced since the solution flows sequentially through the compartments. Nonetheless, both the heavy metal and cyanide content of the solution are reduced in the cell, thus, the term "concurrently" reduced is believed proper and appropriate. Broadly, the term "heavy metals" as used herein, refers to those metals having a specific gravity of at least four and further is defined as at least one metal selected from the group consisting of nickel, lead, and Groups IB and IIB of the Periodic Table of the Elements as shown in "Handbook of Chemistry and Physics," 52nd Edition 1971–72, The Chemical Rubber Co., Ohio. The present invention is particularly applicable to aqueous solutions containing cyanide and one or more heavy metals selected from the group consisting of nickel, zinc, lead, cadmium and copper. Aqueous solutions containing cyanide and various combinations of the aforementioned metals are obtainable from industrial sources such as chemical plating plants, waste streams from mines, and the like.

In addition to the cyanide and heavy metal, the aqueous solution may contain other ions of other elements or compounds such as potassium, sodium, chloride, carbonate, or sulfate. The presence of such other ions does not interfere with the practice of the present invention. Indeed, the presence of a certain amount of a salt, for example, may be necessary to increase the electrolytic conductivity of the solution. It is preferred that the solution have an electrolytic conductivity of approximately $10^{-4}$ mho/cm and preferably about $10^{-3}$ mho/cm or higher. If the conductivity of the solution is too low, it is readily adjustable by the addition thereto of one or more salts such as alkali metal or alkaline earth metal chlorides, sulfates, carbonates, hydroxides, nitrates, or the like. Sodium sulfate and sodium chloride are the preferred salts, as they are readily available and relatively inexpensive.

The pH of the solution to be treated may be either acidic, neutral or basic. It generally is preferred, however, that the solution have a substantially basic pH before treatment and particularly good results are obtained at a pH of from about 8 to 11.

Temperature is not critical and the invention is applicable to a solution maintained at any temperature under conditions at which it is a liquid. It generally is preferred, however, to operate under substantially ambient conditions of temperature and pressure.

The initial concentration of cyanide and heavy metal in the solution to be treated also is not critical. Indeed, the concentration of cyanide and heavy metal is limited only by their solubility in the solution. In accordance with the present invention it is possible to reduce the initial concentration (which generally is below about 500 ppm) to less than one part per million (ppm) if desired. The cyanide and heavy metal content of most waste waters generally is less than a few hundred ppm and it usually is sufficient if such content is reduced to less than about 1 or 2 ppm.

For convenience, the method of this invention will be described with reference to the apparatus shown in the drawing. The aqueous solution containing cyanide and at least one heavy metal is passed sequentially through a bed of electrically conductive particles contained in a first compartment and a bed of electrically conductive particles contained in a second compartment of an electrochemical cell. The two compartments are separated by an electronically nonconductive foraminous member which is provided with a plurality of openings. The foraminous member permits the free passage of electrically charged ions therethrough, but is substantially impermeable to water. Thus, the bulk of the liquid necessarily must move through a substantial depth of the bed providing a maximum residence time within each bed.

An applied potential from about 1.0 to 10 volts is maintained between the two compartments whereby one of the compartments is cathodically polarized and the other anodically polarized. A direct electrical current flows between the compartments through the solution and the foraminous member. The heavy metal contained in solution is deposited upon the electrically conductive particles in the cathodically polarized compartment and the cyanide ion is oxidized in the anodically polarized compartment.

The precise mechanism by which the cyanide and heavy metal content of the aqueous solution is reduced is not fully understood, and the present invention should not be considered as limited by the following theoretical explanation. However, it is believed that the dissolved metal ion, generally present in a complexed state with a negatively charged ion, is reduced and deposited upon the cathodically polarized particles as the elemental metal. The cyanide, however, is believed to be either fully oxidized in the anode compartment to form carbonate ion and nitrogen or partially oxidized to form $CNO^-$, which is essentially non-toxic and suitable for discharge from the cell.

In solutions containing cyanide and heavy metal, frequently the heavy metal and cyanide are present as a metal-cyanide complex. If the cyanide ion is oxidized prior to metal removal, the metal ion in the complex would be released, an possibly by hydrolysis form an insoluble hydroxide precipitate, which precipitate, if present in a sufficient amount, could plug the bed and restrict the flow of solution therethrough. Therefore, in accordance with a preferred embodiment the aqueous solution is first introduced into the cathodically polarized compartment and from there flows into the anodically polarized compartment. There maybe instances, however, when it is desirable to introduce the solution first into an anodically polarized chamber and then into a cathodically polarized chamber, and such may be done without departing from the scope of this invention. may be Tin is a particularly preferred material for the electrically conductive particles contained in the cathodically polarized chamber. More particularly, as reported in Assignee's co-pending application (Removal of Heavy Metals from Water and Apparatus Therefor; Ser. No. 477,531, filed June 7, 1974), tin has been found to be more effective for the removal of mixtures of heavy metals from aqueous solutions than many of the other electroconductive metals. Further, tin has favorable electrochemical properties for reprocessing; thus, it is readily separable from the heavy metal and recycled. Still further, tin generally is considered to be nontoxic as an impurity in water, thus any loss of tin to the treated water would be relatively innocuous. More importantly, however, it has been found that tin forms a substantially inert oxide coating in the solution, which coating remains protective in the absence of an applied potential, thus substantially no measurable amount of tin is lost in solution. The oxides of other metals such as zinc do not provide equally protective coatings against corrosion.

Graphite is the preferred material for use in the anodically polarized compartment, since it is not readily oxidized or attacked under anodic conditions. Further, graphite is relatively inexpensive.

Having described the invention in general terms, the following example is set forth for the purpose of illustration and is not intended to limit the scope of the invention.

EXAMPLE

This example is set forth to demonstrate the efficacy of the method and apparatus of the present invention. The apparatus utilized is substantially the same as that set forth in the drawing. The electrochemical cell is about 6 feet in height, substantially cylindrical in shape, and has an outside diameter of about 9.0 inches. in accordance with a preferred embodiment, the members designated by reference numerals 32, 34, 36 and 40 are made of plastic (polystyrene). The compartment designated by reference number 12 is selected to be the cathode compartment and is provided with a bed of tin particles having a size within the range of from about 12 to 30 mesh. The electrochemical cell is provided with an anode collector 39, which is a graphite rod approximately ⅝ inch in diameter by 6 feet in length. Anode collector 39 is centrally located in anode compartment 14 and extends throughout the depth of the bed of particles 18. The cell also is provided with six cathode collectors which are stainless steel rods plated with tin. The cathode collectors extend a substantial depth into the bed of tin granules and are arranged circumferentially about the cell. The cathode and anode collectors are connected to a source of direct electric current capable of maintaining a potential of from about 3 to 9 volts while supplying a direct electrical current to the cell.

The electronically nonconductive foraminous member 20 has a porosity of about 70% and median pore size of from about $10^{-10}$ to $10^{-12}$ cm$^2$.

Attached to the bottom of foraminous member 20 is an anode bed support plate 22 provided with a plurality of holes therethrough, each of the holes having a diameter of about ¼ inch. Support plate 22 is covered with a Teflon-coated screen 26 which has a mesh size of about 50 mesh.

An aqueous solution (a waste water from a plating process) is obtained having the composition and concentration set forth in the table below.

The aqueous solution is introduced into the cathode compartment at a rate of 0.7 gallons per minute. The solution passes down through the bed of tin particles in the cathode compartment, through the bed support plate and screen, flowing upwardly through the anode compartment and bed of graphite particles, and then passes out of the cell through opening 30. The cathode and anode compartments are sized such that the solution has an average residence time in each of the compartments of about 3.0 minutes and 2.5 minutes, respectively. While the solution is flowing through the cell, an applied potential of about 8 volts is maintained between the cathode and anode.

A quantity of the effluent water from outlet 30 is obtained, analyzed and the results are as set forth in the table below.

TABLE

| Constituent | Feed (ppm) | Effluent (ppm) |
|---|---|---|
| CN | 10 | 1 |
| Cu | 5 | 0.1 |
| Zn | 5 | 1 |
| Cd | 2 | 0.05 |

From the foregoing table, it is seen that the effluent water has a substantially reduced cyanide and heavy metal content, thus demonstrating the efficacy of the invention.

After a desired amount of metal has been deposited upon the bed of particles contained in the cathodically polarized compartment, the particles are readily regenerable for additional use by electrochemical or chemical means as described in pending application Ser. No. 477,531.

Another method of regenerating the particles comprises contacting the particles with an ammonia solution such as an aerated solution of $NH_4OH(NH_3)$. The aerated ammonium hydroxide oxidizes and solubilizes metals such as zinc, copper and nickel by the formation of amine complexes. Tin, however, does not form such complexes, and is substantially unaffected. The heavy metals are carried out of the bed by the solution, and the tin then is ready for further use in accordance with the present invention.

The heavy metals are readily recoverable from the wash solution by the addition thereto, for example, of a precipitant ($Na_2S$) and a coagulant, $Fe_2(SO_4)_3$. The heavy metals form a precipitate which is recovered by filtration, decantation, or the like. The $NH_4OH$ is released and recyclable for further use. Alternatively, the metals may be recovered from the wash solution by electrochemical means.

Many variations and embodiments of the invention will be apparent to those versed in the art. It is to be understood, therefore, that the scope of the invention is not to be limited to the specific embodiments herein depicted, reference being had to the appended claims for such purpose.

What is claimed is:

1. A method of concurrently reducing the heavy metal and cyanide content of an aqueous solution containing the same comprising:
   a. passing the aqueous solution sequentially through a bed of electrically conductive particles contained in a first compartment and then through a bed of electrically conductive particles contained in a second compartment of an electrolytic cell, said first compartment being separated from said second compartment by an electronically nonconductive foraminous member, said foraminous member having a plurality of openings, said openings having a median size within the range of from about $10^{-6}$ to $10^{-14}$ square centimeters;
   b. maintaining an applied potential of from about 1.0 to 10 volts between said first and second compartments whereby a direct electrical current flows between said compartments through said foraminous member and the heavy metal is deposited upon the electrically conductive particles in one of said compartments and the cyanide is oxidized in the other of said compartments, and
   c. discharging the aqueous solution of substantially reduced heavy metal and cyanide content.

2. The method of claim 1 wherein said first compartment is a cathodic compartment.

3. The method of claim 2 wherein said bed of electrically conductive particles in said first compartment is a bed of particles having tin surfaces.

4. The method of claim 3 wherein said bed of electrically conductive particles in said second compartment is a bed of graphite particles.

* * * * *